United States Patent Office 3,573,081
Patented Mar. 30, 1971

3,573,081
METHOD FOR PRODUCING PIGMENTS OF IMPROVED DISPERSIBILITY
Albert Dietz, New Martinsville, W. Va., assignor to PPG Industries, Inc., Pittsburgh, Pa.
No Drawing. Continuation-in-part of application Ser. No. 515,730, Dec. 22, 1965. This application Aug. 15, 1969, Ser. No. 850,670
Int. Cl. C08h 17/04; C09c 1/36, 3/021
U.S. Cl. 106—300
15 Claims

ABSTRACT OF THE DISCLOSURE

Pigmentary metal oxides, e.g., titanium dioxide, are treated with an organic amine and an organic compound containing at least one activated methylene group.

CROSS-REFERENCE TO RELATED APPLICATIONS

The present application is a continuation-in-part of my application Ser. No. 515,730, filed Dec. 22, 1965 now abandoned.

BACKGROUND OF THE INVENTION

Pigmentary metal oxides, such as titanium dioxide, iron oxide and silicon dioxide, have been treated with organic compounds to improve their dispersibility in and/or wetting properties toward surface coating vehicles in which they are used. Usually, the improvement in wetting properties is selective to either oleoresinous vehicles or water. For example U.S. Pat. 2,742,375 discloses that pigments having improved hydrophobic and organophilic properties can be prepared by coating the pigment particles with a small amount of a high molecular weight pyridinium chloride. U.S. Pat. 2,313,621 discloses that water soluble alkali metal enolates of diketones can be used as wetting agents for pigments such as carbon black, sulfur, zinc oxide and titanium dioxide. Other patents dealing with the treatment of pigments with various organic agents include U.S. Letters Patents 3,015,573; 3,147,130; 3,147,131; 3,172,772; German Pat. 1,166,397 and British Pat. 973,463. Since most organic treatment of pigments results in a pigment selective to either an oleoresinous or a water vehicle, it is desirable to utilize a treatment that improves a pigment's wettability in both oleoresinous and water systems since such treatment would increase customer utility.

BRIEF SUMMARY OF THE INVENTION

It has now been discovered that pigmentary metal oxides, notably pigmentary titanium dioxide, can be organically treated to improve their dispersibility in both oleoresinous and water systems, i.e., provide a pigment with improved oleophilic and hydrophilic properties. More specifically, and in accordance with the present invention, pigmentary inorganic metal oxides are treated with an amine and an organic compound having at least one activated methylene group.

DETAILED DESCRIPTION

The present invention relates to pigmentary metal oxides of improved dispersibility, dispersion stability and improved oleophilic and hydrophilic properties, and to a method for producing said pigments. The present invention relates particularly to pigmentary metal oxides, notably pigmentary titanium dioxide, having the aforesaid improved properties as a consequence of the presence thereon of the reaction product of an amine and an organic compound possessing an activated methylene group.

As used herein, the term "metal oxide" is intended to mean and include the so-called metalloid oxides. Examples of metal oxides to which the process of the present invention can be applied include the oxides of aluminum, arsenic, beryllium, boron, cadmium, cobalt, gadolinium, germanium, hafnium, lanthanum, nickel iron, samarium, scandium, silicon, strontium, tantalum, tellurium, terbium, thorium, thulium, tin, titanium, yetterium, yetterbium, zinc, zirconium, niobium, gallium antimony and lead. Particularly preferred are the oxides of aluminum, boron, cobalt, nickel, iron, silicon, tin, titanium, zinc, zirconium, antimony and lead.

For the purposes of simplicity and brevity, the present discussion will be limited to the treatment of titanium dioxide which is, at present, the chief white pigment of commerce.

Pigmentary titanium dioxide is currently produced commercially by two principal processes. One process involves the vapor phase reaction of a titanium halide, i.e., the chloride process. The other process involves the acid digestion and hydrolysis of a titaniferous ore, i.e., the sulfate process. The chloride process characteristically involves the vapor phase oxidation or hydrolysis of at least one titanium halide, particularly a titanium tetrahalide, selected from the group consisting of titanium tetrachloride, titanium tetrabromide and titanium tetraiodide. Titanium tetrafluoride is not considered generally to be useful for this process.

Typical vapor phase oxidation and/or hydrolysis processes are described in U.S. Letters Patents 1,885,934 to Mayer; 2,450,156 to Pechukas; 2,502,347 to Schaumann; 2,791,490 to Wilcox; 2,760,275 to Olson et al.; 2,968,529 to Wilson; 3,068,113 to Strain et al.; 3,069,281 to Wilson; British Pat. 876,672; and British Pat. 726,250.

A vapor phase reaction process may be conducted within or in combination with a fluidized bed as disclosed in U.S. Letters Patents 2,760,846 to Richmond; 2,856,264 to Dunn, Jr.; 2,964,386 to Evans et al.; 3,022,137 to Nelson; 3,036,926 to Hughes; 3,073,712 to Wigginton et al.; and 3,097,923 to Walmsley.

The sulfate process characteristically involves producing a titanium hydrate by the hydrolysis of a titanium sulfate solution and calcination of the hydrate to produce titanium dioxide pigment. Typical sulfate processes are disclosed in U.S. Letters Patents 2,505,344; 2,766,133; 2,933,408 and 2,982,613.

The titanium dioxide pigment benefitted by the process described herein includes all types and grades of titanium dioxide, irrespective of the manner by which it is prepared, for the reason that the present process is directed to the treatment of the surface of the pigment. Specifically included are titanium dioxide containing small amounts of alkali and/or alkaline earth metals, e.g., potassium, calcium and magnesium, or the oxides or inorganic salts thereof as conditioning agents; the compounds of other metals such as antimony, chromium and zinc as brighteners; rutilizing agents such as aluminum or zirconium; particle size regulators such as silicon and potassium; and various conventional hydrous metal oxides, e.g., the hydrous metal oxides of aluminum, titanium, magnesium, zirconium, silicon, etc. as surface coating agents that improve the pigmentary properties of the pigment. The amount of the aforesaid added materials is normally small and usually represents less than 15 weight percent of the pigment. The invention is further usefully applied to titanium dioxide pigment containing extender material such as calcium sulfate, barium sulfate, lithopone, etc.

In accordance with the present process, a pigmentary metal oxide, notably titanium dioxide, is treated with the reaction product of an organic amine and an organic compound containing at least one activated methylene group. For the sake of brevity, the latter compound will also be referred to hereinafter as the AMG (activated methylene group) organic compound. The aforesaid treatment produces a pigment with improved oleophilic and hydrophilic properties, i.e., it improves the wettability of the pigment in both oleoresinous and water systems, and especially improves the dispersibility and dispersion stability of the pigment as measured by the Hegman texture gage, gloss, tint efficiency and other pigment performance tests. By dispersion stability is meant that a pigment treated in accordance with the present process exhibits less deterioration of dispersion during storage than untreated pigment.

The above-described pigment treatment can be accomplished by any convenient method that provides intimate contact of the surface of the pigment with the amine and AMG organic compound. Thus, the treatment can be effected separately or concurrently with conventional physical or chemical processing of the pigment, i.e., prior to, during or subsequent to a stage of said conventional processing.

In one particular embodiment, the pigment can be fluid energy milled in the presence of one or both of the organic reagents that will be described in more detail hereinafter. In the former case, a second milling in the presence of the other organic reagent is performed. By slowly metering the organic reagent(s) into the mill simultaneously with the introduction of the pigment therein, the organic reagent(s) is spread over the surface of the pigment by means of the particle movement and collisions produced in a fluid energy mill.

In another embodiment, the pigment can be slurried in a suitable solvent, e.g., water or ethanol, in the presence of one or both of the organic compounds. By suitable solvent is meant a material that acts as a solvent for one or both of the organic reagents and is chemically compatible with the pigment. In addition, the solvent should be easily removable by, for example, drying the pigment. In a particular embodiment, it is contemplated slurrying the pigment in the presence of the organic reagents subsequent to the coating of the pigment with hydrous metal oxides. In still another embodiment, pigment is recovered from an aqueous slurry by evaporation, spray drying, filtration or other equivalent means and dried in the presence of the organic reagents. In such embodiment, the organic reagents can be added to the slurry before the pigment is recovered therefrom, or incorporated with the pigment subsequent to recovery from the slurry.

Further contemplated embodiments of this invention include, not by way of limitation, physically processing the pigment in the presence of the organic reagents. Thus, a pigment slurry can be subjected to hydroseparation, milling or otherwise classified in the presence of the organic reagents.

In a preferred embodiment of this invention, titanium tetrachloride is reacted with oxygen in the vapor phase to produce pigmentary titanium dioxide. The pigment is recovered, slurried in water, classified by hydroseparation, and coated with one or more hydrous metal oxides, e.g., the hydrous metal oxides of titanium, silicon, aluminum, boron, zinc, zirconium and mixtures thereof. The hydrous oxide coated pigment is then contacted with the organic reagents by their addition to the slurry. The pigment is then recovered from the slurry and dried. It is also contemplated that the hydrous oxide coated pigment be recovered first from the slurry, optionally dried and then organically treated.

The practice of the present process is typically carried out at temperatures of less than 300° C., usually from 20° C. to 250° C. at ambient pressure. Higher temperatures, however, can be used, particularly when the pigment slurry is heated and digested under high pressures. Likewise, higher temperatures can be attained when the pigment is contacted with the organic treating agents in a fluid energy milling operation (e.g., with superheated steam or an inert gas such as nitrogen) or when the pigment is being heat neutralized with superheated steam or NH$_3$. Likewise, temperatures below 20° C. can be used if desired. In any case, the temperature of treatment should be below the temperature at which the pigment tends to discolor (in the absence of the organic treating compounds). Generally, temperatures of less than 650° C., usually below 550° C., do not encounter any significant discoloration.

The amount of AMG compound used can vary over a broad range; but, typically will be only that amount required to improve the dispersibility of the pigment. Typically, from 0.001 to 10.0 weight percent, preferably from 0.01 to 3.0 weight percent, of such compound based on the weight of pigment treated, is used.

The amount of amine used in combination with the aforesaid AMG organic compound will also vary as broadly, and in the same amounts. Typically, the mole ratio of amine to AMG compound will range from 0.1 to 10.0, more typically from 0.1 to 5.0, and preferably from 0.1 to 1.0. Generally, the total amount of amine and AMG organic compound, i.e., the reaction product, used varies from 0.002 to 10 weight percent, preferably from 0.02 to 5 weight percent, based on the amount of pigment treated.

Organic compounds containing an activated methylene group that are useful in the present process can be represented by the formula:

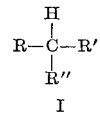

I wherein C is a methylene carbon atom, which for purposes of the above formula is defined as a carbon atom containing one or two hydrogen atoms ($>CH_2$ or $\rightarrow CH$); R is a monovalent electron withdrawing group or an organic radical containing a bivalent electron withdrawing group adjacent to the methylene carbon atom; and R' and R'' are each selected from the group consisting of R, hydrogen, $C_1$–$C_{20}$ substituted and unsubstituted hydrocarbon radicals and $C_1$–$C_{20}$ heteroatom containing hydrocarbon radicals, as more fully described hereinafter. The portion of the organic radical other than the electron withdrawing group R in Formula I can be a hydrocarbon radical (saturated or unsaturated and substituted or unsubstituted) of usually not more than 20 carbon atoms, can be devoid of hydrocarbon structure, e.g., amino, as in the amides, or contain both, as in the anilides. Further, when the electron withdrawing group is carbonyl, the organic radical can be an ester group, i.e.,

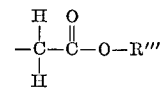

wherein R''' is a $C_1$–$C_{20}$ alkyl or $C_6$–$C_{12}$ aryl. Since C in Formula I is a methylene carbon atom, i.e., by definition contains only one or two hydrogen atoms bonded directly to it, only one of R' and R'' can be hydrogen at the same time. Thus, for example, when R' is hydrogen, R'' may not be hydrogen. The electron withdrawing group of R, R' and R'' can be the same or different. Preferably, at least two of R, R' and R'' are electron withdrawing groups or organic radicals containing an electron withdrawing group adjacent to the methylene carbon atom. Similarly, R' and R'' can be the same or different hydrocarbon radicals. Further, R, R' and R'' can be connected to form a cyclic AMG compound.

An activated methylene group or reactive methylene gorup, as it is often termed, is a well-known concept and is described in many organic chemistry texts. More simply, it is a carbon atom having one or two, usually two, hydrogen atoms attached to it, at least one of which hydrogen atoms is more easily removed than a normal carbon hydrogen, i.e., the carbon-hydrogen bond is weaker than normal. The reactivity or mobility of these hydrogen atoms is caused by the presence of an electron withdrawing group adjacent to the methylene carbon atom.

Electron withdrawing groups or atoms are atoms or groups of atoms which have the ability to attract electrons. This property is commonly referred to as electronegativity which has been defined as the power of a chemically bonded atom or group to attract electrons to itself. This concept is used to designate the relative electropositive or electronegative character of an element or group as it appears in a given state of chemical combination. The concept of electronegativity and electron withdrawing groups is well known. Atoms or groups typically characterized as being electronegative or electron withdrawing include: unsaturated linkages, e.g., unsaturated carbon-carbon linkages

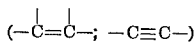

(particularly allylic unsaturation) and imino groups (>C=N—H); nitro (O$_2$N—) and nitroso (ON—) groups; aryl, e.g., phenyl (C$_6$H$_5$—) groups; carbonyl (>C=O) groups; sulfonyl (>SO$_2$) and sulfinyl (sulfoxide) (>SO) groups; nitrile (—CN) groups; phospho (O$_2$P—) and phosphoroso (OP—) groups; mono-, di- and tri-halogen containing carbon atoms; and ring halogen substituted aryls, e.g., chlorophenyl. The term halogen is intended to include fluorine, chlorine, bromine and iodine.

The utility of the aforementioned AMG organic compounds is based on the ability of the carbon atom of the reactive methylene group to lose or donate a proton, which ability is a function of the presence of the electron withdrawing group(s) adjacent to that carbon atom. In the Lewis concept of acids and bases, the AMG organic compound is an acid, i.e., an electron acceptor or proton donor. Thus, any organic compound containing an activated methylene group has the ability to denote a proton (H atom) attached to the carbon atom of the reactive methylene group and thereby act as a Lewis acid. The remainder of the molecule has little effect on the proton-donating ability of the compound because of the presence of the adjacent electron withdrawing group(s). Thus, electrons associated with the carbon atom of the activated methylene group are drawn away from the hydrogen atom of that group permitting the hydrogen atom to be mobile (lost) and drawn to a proton-accepting molecule, e.g., a Lewis base, which in the present process is an organic amine.

Of particular utility as an electron withdrawing group is the carbonyl (>C=O) group. Thus, particularly contemplated are compounds containing the structure:

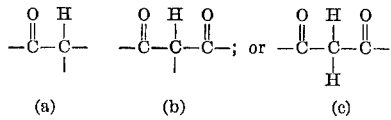

Most preferred are compounds containing the structures (b) or (c) above. The remaining portion of the compounds containing the structures (a), (b) or (c) can be selected from straight-chain or cyclic hydrocarbon radicals (substituted or unsubstituted), amino radicals or other equivalent organic radicals as described herein.

In Formula I, the hydrocarbon portion of R, R' and R" can each be selected from the group consisting of C$_1$–C$_{20}$, preferably C$_1$–C$_{12}$ alkyl, C$_2$–C$_{20}$, preferably C$_2$–C$_{12}$ alkenyl, C$_2$–C$_{20}$, preferably C$_2$–C$_{12}$ alkynyl, C$_6$–C$_{12}$ aryl, C$_3$–C$_8$ cycloalkyl, C$_3$–C$_8$ cycloalkenyl, C$_6$–C$_{12}$ arylalkyl, C$_6$–C$_{12}$ alkylaryl, C$_6$–C$_{12}$ alkenylaryl and arylalkenyl; C$_6$–C$_{12}$ arylalkynyl; and C$_3$–C$_9$ heterocyclic radicals.

Typical alkyl radicals include: methyl, ethyl, propyl, butyl, pentyl, hexyl, octyl, decyl, hendecyl, dodecyl, octadecyl, 2-ethylhexyl, 2-ethyloctadecyl, 2-nonylhendecyl and 2-octyldodecyl. Examples of alkenyl radicals include: 1-ethenyl, 3-butenyl, 4-hexenyl, 6-heptenyl, 8-nonenyl, 10-hendecenyl, 11-dodecenyl, 17-octadecenyl, 19-eicosenyl, 1-methyl-2-propenyl, 2-ethyl-12-tridecenyl, 1-heptenyl-9-decenyl, 2-methyl-18-nonadecenyl, 1,3-pentadienyl, 2-dimethyl-5-hexenyl and 3-chloro-1-butenyl.

Typical alkynyl radicals include: 1-ethynyl, 4-pentynyl, 5-hexynyl, 9-decynyl, 12-tridecynyl, 15-hexadecynyl, 19-eicosynyl, 1-methyl-4-pentynyl, 2,2,4-trimethyl-5-hexynyl, and 1-ethyl-17-octadecynyl. Typical cycloalkyl and cycloalkenyl radicals include: cyclopropyl, cyclobutyl, cyclopentyl, cyclohexyl, 3-cyclohexenyl and cyclopentyl.

Typical aryl radicals include: phenyl, p-terphenyl, quinonyl, metaphenylene, and naphthyl. Typical arylalkyl and alkylaryl radicals include: benzyl, meta-tolyl, metaxylyl, 2-phenyl-propyl, indanyl and paracyclohexyl phenyl. Typical arylalkenyl or alkenylaryl radicals include: beta-styryl, meta-isopropenyl phenyl and para 1-cyclohexenyl phenyl. Typical arylalkynyl or alkynylaryl radicals include: phenylethynyl and metaethynyl phenyl.

Typical heterocyclic radicals include: benzofuryl, furyl and benzopyranyl. Typical contemplated radicals containing atoms other than carbon and hydrogen include, but not by way of limitation, the thioalkyls, alkoxys such as phenoxy, benzoyl, acetyl, naphthoyl, salicyl, phenylcarbamido, phthalyl, anthranilo and benzohydryl.

When R. R' and R" contain hydrocarbon radicals or heteroatom containing hydrocarbon radicals, it is preferred that each should not exceed 20 carbons, more preferably, less than 12 carbon atoms, so that compounds represented by Formula I above do not exceed a total of 41 carbon atoms, and preferably are less than 25 carbon atoms.

Common heteroatoms in the aforementioned heteroatom containing hydrocarbon radicals include: phosphorus, sulfur, oxygen and nitrogen. Common substituents on the hydrocarbon radical, other than other hydrocarbons, include: halogen, e.g., chlorine, bromine, fluorine and iodine; amino, hydroxyl, carbonyl, and isocyanato.

Representative examples of AMG organic compounds that can be used in the process described herein include:

(1) CNCH$_2$CN (2) CH$_3$COCH$_2$SO$_2$CH$_3$ (3) CH$_3$COCH$_2$COCH$_3$ (4) CH$_3$COCH$_2$CN (5) CH$_3$COCH$_2$NO$_2$ (6) CH$_3$COCH$_2$COOCH$_3$ (7) CH$_3$COCH$_2$COOC$_2$H$_5$ (8) 

(9) C$_2$H$_5$SO$_2$CH$_2$CN

(10) C$_2$H$_5$SO$_2$CH$_2$SO$_2$C$_2$H$_5$

(11) CH$_3$SOCH$_2$SOC$_2$H$_5$

(12) CH$_3$COCH$_2$PO$_2$

(13) C$_2$H$_5$SOCH$_2$PO

(14) C$_2$H$_5$SO$_3$CH$_2$PO$_2$

(15) 
COOR$^1$
|
CH$_2$
|
COOR$^2$ (malonic ester where R$^1$ and R$^2$ may be the same or different aliphatic or aromatic hydrocarbon radicals not more than 20 carbon atoms as defined hereinbefore.)

(16) 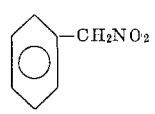

(17) 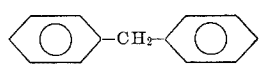

(51) 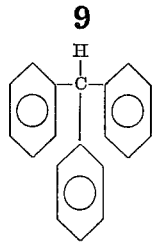
triphenylmethane

(52) 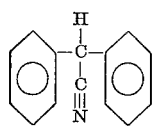
diphenylacetonitrile

(53) 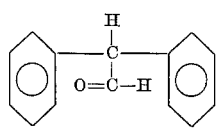
diphenylacetaldehyde

(54) 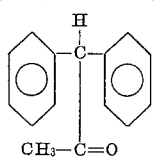
1,1-diphenylacetone

(55) 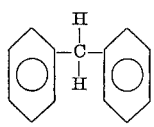
diphenylmethane

(56) 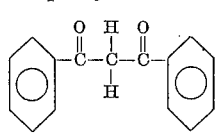
dibenzoylmethane

Utilized in conjunction with the aforesaid AMG organic compound for treating pigment is an organic amine. In the Lewis acid-base concept, the amine is an electron donor or proton acceptor because of the unshared pair of electrons on the nitrogen atom of the amine. Since all amines have this characteristic, any amine capable of accepting a proton from the proton-donating AMG organic compound can be used in the present process.

Amines which are particularly contemplated for use in the process described herein include: $C_1$–$C_{20}$ iso and normal primary, secondary and tertiary amines, which include by definition the alkylmonoamines, alkyldiamines, alkyltriamines, alkynylmonoamines, alkynyldiamines, alkynyltriamines, alkenylmonoamines, alkenyldiamines, alkenyltriamines, arylmonoamines, aryldiamines, aryltriamines, arylalkyldiamines and cycloalkylamines. Preferred are tertiary amines of from 1 to 10 carbon atoms.

Representative examples of such amines include, not by way of limitation, cyclopentylamine, cyclohexylamine, methylamine, ethylamine, n-propylamine, isopropylamine, n-butylamine, iso-butylamine, n-amylamine, iso-amylamine, n-hexylamine, iso-hexylamine, laurylamine, hexadecylamine, stearylamine, dimethylamine, diethylamine, di-n-propylamine, di-n-butylamine, di-n-amylamine, di-n-hexylamine, dilaurylamine, dihexadecylamine, trimethylamine, triethylamine, tri-n-propylamine, tri-n-butylamine, tri-n-amylamine, tri-n-hexylamine, trioctylamine, trilaurylamine, trihexadecylamine, dodecylamine, octadecylamine, ethyleneamine, ethylenediamine, triethyl- eneamine, diethylenetriamine, trimethylenediamine, tetramethylenediamine, pentamethylenediamine, hexamethylenediamine, 1,6 - hexanediamine, N-cocotrimethylenediamine, alkylol amines including monoisopropanolamine, methylisopropanolamine, phenylethanolamine, monobutanolamine, monoethanolamine, monopropanolamine, beta - phenylethylamine, dibutanolamine, methylethanolamine, ethylbutanolamine, monomethanolamine, dimethanolamine, trimethanolamine, diethanolamine, dipropanolamine, acetylisobutylamine, di-beta-phenylethylamine, diethylhexanolamine, triethanolamine, tripropanolamine, acetyldiisopropylamine, N-nitrosodimethylamine, N-soyatrimethylenediamine, N - tallowtrimethylenediamine, bis-2 - hydroxyethyl soyabean amine, morpholine, N-methyl morpholine, pyridine, 2 - methyl pyridine, 4 - methyl pyridine, piperidine, 4 - picoline, melamine, benzylamine, diphenylamine, triphenylamine, tribenzylamine, o-phenylenediamine, p-phenylenediamine, m-phenylenediamine, aniline, N-ethylaniline, N,N-diethylaniline, o-chloroaniline.

In selecting the particular AMG compound and organic amine to be used in the practice of the present process, the relative strength, i.e., acidity (proton donor) and basicity (proton acceptor) of each is taken into consideration. Thus, a weakly acidic proton-donating AMG organic compound should be used with a strongly basic amine and vice versa to insure that a reaction, i.e., proton transfer, occurs between the two treating agents. The use of a strongly acidic AMG organic compound and strongly basic amine is preferred. The determination of the relative acidity or basicity of the aforementioned respective compounds is performed by examination of the chemical structure of the particular compound, i.e., by examination of the electronic configurations around the methylene carbon atom and nitrogen atom of the respective treating agents. Such determinations are well known in the field of chemistry and need not be discussed herein.

A practical method for determining if a reaction (proton transfer) occurs between a particular AMG organic compound and amine is to mix the two agents and ascertain if there is a change in the water solubility of the mixture. The water solubility can increase or decrease; however, the change in solubility indicates that a reaction has occurred.

Although not intending to be bound by any particular theory, it is believed that the improved dispersibility of pigments treated in accordance with the present process in oleoresinous vehicles is produced by the presence of the organic portion of the reaction product of the AMG organic compound and amine on the surface of the pigment. Similarly, the improved dispersibility in water of such pigments, i.e., the hydrophilic character, is produced by the ionic character of the reaction product as a result of the proton transfer discussed above.

In treating pigment with the reaction product of the AMG organic compound and amine, either agent can be added separately to the pigment or both can be added simultaneously. Preferably, the AMG compound is placed on the surface of the pigment first, the amine added thereafter and the reaction between the two permitted to occur on the surface of the pigment. In another embodiment, the two reagents can be premixed and the mixture applied to the surface of the pigment. In still another embodiment, a common solvent for both the AMG compound and amine can be used to provide a premixture or to aid in the application of each agent to the pigment surface. When a solvent is used, care should be exercised in its selection so that it is not of the type which will interfere or hinder the reaction between the treating agents, hinder the dispersion of the pigment, or be difficult to remove from the surface of the pigment. Water and ethanol are exemplary of two solvents that can be used.

The practice of the present process greatly improves and enhances the pigmentary properties of the pigment treated. For example, titanium dioxide pigment treated in accordance with this invention characteristically has improved tinting strength, tint efficiency, tint tone, wetting and dispersion characteristics. The tinting strength and tint tone of pigment can be determined by A.S.T.M. Method D–332–26, 1949 Book of A.S.T.M. Standards, part IV, page 31, published by American Society for Testing Materials, Philadelphia 3, Pa. The tint efficiency, as used herein, refers to the reflectometry method disclosed on pages 704 to 715, volume 34 of the Journal of Paint Technology and Engineering (Official Digest, July 1962), now A.S.T.M. Test Method D–2745–687. The wetting characteristics of a pigment refer to the ease of incorporation of the pigment into paint vehicles or vehicle systems. Dispersion can be defined as the ability of a pigment to distribute in a dissimilar substance, particularly a paint vehicle and usually a non-aqueous organic vehicle. In the pigment art, dispersion is frequently referred to as the fineness of grind of pigment as measured by the Hegman gage, (A.S.T.M. Test Method D–1210–64).

Since the present process is generally applied to pigments that typically produce a high Hegman dispersion rating, a test was developed that would discriminate small, but significant differences in dispersion. In this test, referred to herein as the Low Shear Dispersion Test, a high quality commercial titanium dioxide pigment that normally yields a dispersion rating of 7½ Hegman in a standard dispersion test is processed to yield from a 5 to a 5½ Hegman rating. In this manner, improvements in dispersion by the application of the present process can be readily detected. In this test, increases of from ¼–½ of a unit on the Hegman scale are significant. Increases of one unit represent a highly significant improvement.

The Low Shear Dispersion Test used to evaluate dispersion in the examples presented hereinafter was performed in the following manner. Into a mixing container were weighed 115 grams of alkali refined linseed oil [1], 90 grams of mineral spirits [2] and 135 grams of pigment to be tested. The container was placed on a Hamilton Beach Blender [3] and the sample milled for five (5) minutes at the speed setting marked Medium on the blender. After milling a portion of the sample was transferred to a 50 ml. tri-pour beaker, stirred there about one minute with a glass stirring rod, and the sample paste poured promptly onto the upper channel section of the Hegman gage. The sample paste was then drawn down with a vertically held drawbar at a uniform rate and the gage read in accordance with A.S.T.M. Method D–1210–64. The gage was read within twenty seconds of draw down to avoid solvent evaporation effects.

The present process is more particularly described in the following examples which are intended as illustrative only since numerous modifications and variations therein will be apparent to those skilled in the art.

EXAMPLE 1

Titanium dioxide prepared by oxidation of titanium tetrachloride with oxygen at about 1000° C. in the presence of aluminum chloride and silicon tetrachloride (reactor discharge tinting strength of about 1670 and an oil absorption of from about 16 to 17) and containing a surface coating of hydrous titania and hydrous alumina is organically treated by intimately mixing a sample thereof in a beaker with 150 milliliters of an aqueous solution containing 0.3 percent by weight of triethanolamine and 0.5 percent by weight acetylacetone ($CH_3COCH_2COCH_3$—Formula 3)

---
[1] PPG F. L. Golden Varnish Oil—VD18; Viscosity—A minus or less—Acid Number—0.5 Max.
[2] Distillation range 315° F. to 390° F.
[3] Model No. 936; Impellor used is the clover-leaf type permanently attached to shaft of Model No. 960 Hamilton Beach Blender. Diameter of impellor is 1¼ inch and has a 1-inch clearance from bottom of mixing container which has a height of 7 inches, a top inside diameter of 3 3/16 inches which tapers to a 2½ inch diameter at the bottom.

based on titanium dioxide, i.e., a mole ratio of 1:2.5 (amine to acetylacetone). The treated pigment is then recovered and dried overnight in an oven at about 60° C. The dried treated pigment has a tinting strength of 1820 and a tint tone of Blue –2.

A portion of the dried recovered pigment is gradually mixed with an alkali refined linseed oil vehicle in a Cowles Dissolver (Laboratory Model). The Cowles Dissolver is operated at a blade speed of 2,000 linear feet per minute until all of the pigment has been incorporated into the vehicle. The blade speed is then increased rapidly to 2,550 linear feet per minute. After ten minutes, the dissolved pigment is removed from the Cowles Dissolver. The fineness of grind is then determined for the pigment using A.S.T.M. Method D–1210–64, Part 21, January 1965. The pigment has a finess of grind rating of 7½ + Hegman.

For comparison, a portion of the above hydrous oxide coated pigment is processed in the Cowles Dissolver, as above, except that the pigment is not organically treated with the triethanolamine-acetylacetone solution. The fineness of grind for the standard pigment is 4½ Hegman. The pigment has a tinting strength of 1760 and a neutral tint tone.

EXAMPLE II

Stoichiometric amounts of 1,1-diphenylacetone and various amines were dissolved separately in ethanol and water or ethanol respectively so that when reacted the amount of reaction product was equal to about 0.2 weight percent based on the amount of pigment treated. The 1,1-diphenylacetone solution was added to an aqueous slurry of hydrous metal oxide coated titanium dioxide analogous to that of Example I and stirred for thirty minutes. The organic amine solution was added dropwise to the slurry at a rate of about 500 ml./hr. After completion of the amine addition, the slurry was stirred for an additional 30 minutes. The slurry was then poured into evaporation pans and dried at 90° C. for from 16 to 20 hours. The dried pigment was then cooled, pulverized and then fluid energy milled to an oil absorption of from 18.5 to 20.5 at a grind pressure setting of 250 p.s.i.g. and a feed rate of 200 grams per minute. The treated pigment was then tested by means of the above-described Low Shear Dispersion Test. Results are tabulated in Table I, wherein Run 1 is a control (no treating agents).

TABLE I.—1,1-diphenylacetone

| Run | Amine | Amine solvent | Mole ratio, AMG:A [1] | Percent total organic | Dispersion rating, Hegman |
|---|---|---|---|---|---|
| 1 | | | | | 5½ |
| 2 | Triethanol | $H_2O$ | 1:1 | 0.2 | 6¼ |
| 3 | Melamine | $H_2O$ | 3:1 | 0.2 | 6 |
| 4 | Tribenzyl | $C_2H_5OH$ | 1:1 | 0.2 | 6 |
| 5 | Trihexyl | $C_2H_5OH$ | 1:1 | 0.2 | 6 |
| 6 | Triphenyl | $C_2H_5OH$ | 1:1 | 0.2 | 6 |

[1] AMG:A = Activated methylene group compound:amine.

EXAMPLE III

In a manner analogous to Example II, pigmentary titanium dioxide was treated with 1-benzoylacetone in combination with various organic amines. The results are tabulated in Table II.

TABLE II.—1-benzoylacetone

| Run | Amine | Amine solvent | Mole ratio, AMG:A | Percent total organic | Dispersion rating, Hegman |
|---|---|---|---|---|---|
| 1 | | | | | 5½ |
| 2 | Triethanol | $H_2O$ | 1:1 | 0.2 | 6¼ |
| 3 | Melamine | $H_2O$ | 3:1 | 0.2 | 6¼ |
| 4 | Tribenzyl | $C_2H_5OH$ | 1:1 | 0.2 | 6 |
| 5 | Trihexyl | $C_2H_5OH$ | 1:1 | 0.2 | 6 |
| 6 | Triphenyl | $C_2H_5OH$ | 1:1 | 0.2 | 6 |

EXAMPLE IV

In a manner analogous to Example II, pigmentary titanium dioxide was treated with dibenzoylmethane in combination with various organic amines. The results are tabulated in Table II.

TABLE III.—Dibenzoylmethane

| Run | Amine | Amine solvent | Mole ratio, AMG:A | Percent total organic | Dispersion rating, Hegman |
|---|---|---|---|---|---|
| 1 | | | | | 5½ |
| 2 | Triethanol | H₂O | 1:1 | 0.2 | 6½ |
| 3 | Melamine | H₂O | 3:1 | 0.2 | 6¼ |
| 4 | Tribenzyl | C₂H₅OH | 1:1 | 0.2 | 6 |
| 5 | Trihexyl | C₂H₅OH | 1:1 | 0.2 | 6¼ |
| 6 | Triphenyl | C₂H₅OH | 1:1 | 0.2 | 6¼ |

EXAMPLE V

In a manner analogous to Example II, pigmentary titanium dioxide was treated with a water solution of 2,4-pentanedione in combination with various organic amines. The results are tabulated in Table IV.

TABLE IV.—2,4-pentanedione

| Run | Amine | Amine solvent | Mole ratio, AMG:A | Percent total organic | Dispersion rating, Hegman |
|---|---|---|---|---|---|
| 1 | | | | | 5½ |
| 2 | Melamine | H₂O | 3:1 | 0.2 | 6 |
| 3 | Tribenzyl | C₂H₅OH | 1:1 | 0.2 | 6 |
| 4 | Trihexyl | C₂H₅OH | 1:1 | 0.2 | 6 |
| 5 | Triphenyl | C₂H₅OH | 1:1 | 0.2 | 6¼ |

EXAMPLE VI

In a manner analogous to Example II, pigmentary titanium dioxide was treated with a water solution of malonamide in combination with various organic amines. The results are tabulated in Table V.

TABLE V.—Malonamide

| Run | Amine | Amine solvent | Mole ratio, AMG:A | Percent total organic | Dispersion rating, Hegman |
|---|---|---|---|---|---|
| 1 | | | | | 5½ |
| 2 | Triethanol | H₂O | 1:1 | 0.2 | 6½ |
| 3 | Tribenzyl | C₂H₅OH | 1:1 | 0.2 | 6 |
| 4 | Trihexyl | C₂H₅OH | 1:1 | 0.2 | 6 |

EXAMPLE VII

In a manner analogous to Example II, pigmentary titanium dioxide was treated with p-chloroacetoacetanilide in combination with various organic amines. The results are tabulated in Table VI.

TABLE VI.—p-Chloroacetoacetanilide

| Run | Amine | Amine solvent | Mole ratio, AMG:A | Percent total organic | Dispersion rating, Hegman |
|---|---|---|---|---|---|
| 1 | | | | | 5½ |
| 2 | Triethanol | H₂O | 1:1 | 0.2 | 6 |
| 3 | Tribenzyl | C₂H₅OH | 1:1 | 0.2 | 6 |
| 4 | Trihexyl | C₂H₅OH | 1:1 | 0.2 | 6 |
| 5 | Triphenyl | C₂H₅OH | 1:1 | 0.2 | 6¼ |

EXAMPLE VIII

Pigmentary titanium dioxide analogous to that used in Examples II–VII was treated separately with each of the activated methylene group containing compounds and organic amines used in Examples II–VII. The results are tabulated in Tables VII and VIII and compared against a control (no treating agents).

TABLE VII

| Ex. | AMG Compound | Amine solvent | Percent total organic | Dispersion rating, Hegman |
|---|---|---|---|---|
| | | | | 5½ |
| II | 1,1-diphenylacetone | C₂H₅OH | 0.2 | 5½ |
| III | 1-benzoylacetone | C₂H₅OH | 0.2 | 5½ |
| IV | Dibenzoylmethane | C₂H₅OH | 0.2 | 5¾ |
| V | 2,4-pentanedione | H₂O | 0.2 | 5¾ |
| VI | Malonamide | H₂O | 0.2 | 5½ |
| VII | p-Chloroacetoacetanilide | C₂H₅OH | 0.2 | 5¾ |

TABLE VIII

| Amine solvent | Percent total organic | Dispersion rating, Hegman |
|---|---|---|
| Amine: | | 5½ |
| Triethanol......H₂O | 0.2 | 5½ |
| Melamine......H₂O | 0.2 | 5½ |
| Tribenzyl......C₂H₅OH | 0.2 | 5½ |
| Trihexyl......C₂H₅OH | 0.2 | 5½ |
| Triphenyl......C₂H₅OH | 0.2 | 5¾ |

The results of Examples I–VIII show that the dispersibility of pigmentary titanium dioxide is significantly improved by the combined use of an organic compound containing an activated methylene group and an organic amine over the use alone of the AMG compound or of the organic amine.

EXAMPLE IX

One thousand (1000) grams of alumina hydrate prepared by the hydrolysis of a solution of Al₂O₃ in caustic at a pH of approximately 9 (Bayer process—see Encyclopedia of Chemical Technology, Kirk-Othmer, editors, second edition, vol. 1, pp. 937–941, 1963), is organically treated by slurrying the hydrate with 0.2 weight percent of the reaction product of 2,4-pentanedione and melamine as a 10 percent weight solution. The mole ratio of 2,4-pentanedione to melamine is 3:1 and the temperature of treatment is room temperature, i.e., about 25° C. The resulting slurry is poured into evaporating pans and the treated alumina hydrate dried for 12 hours at 90° C. The resulting product is milled in a fluid energy mill and a portion of the milled product tested by the Low Shear Dispersion Test described above. The dispersion rating of the treated alumina hydrate is about 6¼ Hegman. A portion of the alumina hydrate prepared in the same manner but without the aforementioned organic treatment shows a dispersion rating of about 4 Hegman.

EXAMPLE X

Hydrated silica is prepared by reacting a sodium silicate solution with sodium sulfate followed by acidifying the resulting gel slurry with sulfuric acid. The resulting slurry is heated to 85° C., digested for one hour at that temperature, filtered and washed to remove soluble salts. One thousand (1000) grams of resulting SiO₂ is organically treated in aqueous slurry with 0.2 weight percent of the reaction product of dibenzoylmethane and trihexylamine utilized in a 1:1 mole ratio. The treated product is recovered from the slurry, dried at 110° C. for four hours and then milled in a fluid energy mill. A portion of the milled product is tested by the Low Shear Dispersion Test described above and yields a dispersion rating of about 6½ Hegman. A similarly prepared sample of hydrous silica, but without the aforementioned organic treatment, yields a dispersion rating of about 3½ Hegman by the Low Shear Dispersion Test.

EXAMPLE XI

Hydrated iron oxide (Fe⁺⁺⁺) is prepared by the reaction of a 10 percent solution of ferric sulfate with a 10 percent solution of sodium carbonate at 85° C. The gelatinous precipitate resulting from the reaction is aged at 85° C. for two hours and the hydrated iron oxide recovered by filtration. Twelve volumes of water, based on the weight of Fe₂O₃, is used to wash the filter cake to remove soluble impurities. One thousand (1000) grams of Fe₂O₃ as filter cake is organically treated in aqueous slurry with 0.2 weight percent, based on the weight of Fe₂O₃, with the reaction product of 2,4-pentanedione and trihexylamine (in a 1:1 mole ratio) as a 10 percent aqueous solution. The treated Fe₂O₃ is recovered and dried for 16 hours at 70° C. and then fluid energy milled. A portion of the milled product is tested by the Low Shear Dispersion Test described above and yields a dispersion rating of about 6½ Hegman. A similarly prepared sample of hydrated iron oxide without the aforesaid organic treatment yields a dispersion rating of about 3¼ Hegman by the same Low Shear Dispersion Test.

While there are above described a number of specific embodiments of the present invention, especially in connection with pigmentary titanium dioxide, it is obviously possible to produce other embodiments and various equivalent modifications thereof without departing from the spirit of the invention.

Having set forth the general nature and specific embodiments of the present invention, the scope thereof is now particularly pointed out in the appended claims.

I claim:

1. A process for treating pigmentary metal oxide, which comprises contacting said metal oxide with from 0.002 to 10 weight percent, based on metal oxide, of the reaction product of (a) an organic amine selected from the group consisting of $C_1$–$C_{20}$ primary, secondary and tertiary amines, and (b) an organic compound containing an activated methylene group, said organic compound being represented by the formula:

wherein C is a methylene carbon atom, R is a member of the group consisting of a monovalent electron withdrawing group and a mono-organic substituted bivalent electron withdrawing group which is adjacent to the methylene carbon atom, and R' and R" are each selected from the group consisting of R, hydrogen, $C_1$–$C_{20}$ hydrocarbon radicals and $C_1$–$C_{20}$ hydrocarbon radicals containing at least one heteroatom selected from the group consisting of phosphorus, sulfur, oxygen and nitrogen.

2. A process according to claim 1 wherein the pigmentary metal oxide is titanium dioxide.

3. A process according to claim 1 wherein said organic compound (a) is selected from the group consisting of acetylacetone, 1,1-diphenylacetone, 1-benzoylacetone, dibenzoylmethane, 2,4-pentanedione, malonamide and p-chloroacetoacetanilide.

4. A process according to claim 1 wherein said organic amine is selected from the group consisting of triethanolamine, melamine, tribenzylamine, trihexylamine and triphenylamine.

5. A process according to claim 1 wherein from 1 to 2 carbonyl groups are adjacent to the methylene carbon atom.

6. A process for treating pigmentary titanium dioxide, which comprises contacting said pigment with from 0.002 to 10 weight percent, based on titanium dioxide, of the reaction product of (a) an organic amine selected from the group consisting of $C_1$–$C_2$ primary, secondary and tertiary amines, and (b) an organic compound containing an activated methylene group, said organic compound being represented by the formula:

wherein C is a methylene carbon atom, R is a member of the group consisting of a monovalent electron withdrawing group and a mono-organic substituted bivalent electron withdrawing group which is adjacent to the methylene carbon atom, and R' and R" are each selected from the group consisting of R, hydrogen, $C_1$–$C_{20}$ hydrocarbon radicals and $C_1$–$C_{20}$ hydrocarbon radicals containing at least one heteroatom selected from the group consisting of phosphorus, sulfur, oxygen and nitrogen.

7. A process according to claim 6 wherein from 1 to 2 carbonyl groups are adjacent to the methylene carbon atom.

8. A process according to claim 6 wherein the pigmentary titanium dioxide treated has a hydrous metal oxide coating.

9. A process according to claim 6 wherein the pigmentary titanium dioxide is contacted first with the organic compound containing an activated methylene group and then with the organic amine.

10. A process for treating pigmentary titanium dioxide, which comprises contacting said pigment with from 0.002 to 10 weight percent, based on titanium dioxide, of the reaction product of (a) an amine selected from the group consisting of triethanolamine, melamine, tribenzylamine, trihexylamine and triphenylamine and (b) a member of the group consisting of acetylacetone, 1,1-diphenylacetone, 1-benzoylacetone, dibenzoylmethane, 2,4-pentanedione, malonamide and p-chloroacetoacetanilide.

11. Pigmentary metal oxide treated with from 0.002 to 10 weight percent, based on metal oxide, of the reaction product of (a) an organic amine selected from the group consisting of $C_1$–$C_{20}$ primary, secondary and tertiary amines, and (b) an organic compound containing an activated methylene group, said organic compound being represented by the formula:

wherein C is a methylene carbon atom, R is a member of the group consisting of a monovalent electron withdrawing group and a mono-organic substituted bivalent electron withdrawing group which is adjacent to the methylene carbon atom, and R' and R" are each selected from the group consisting of R, hydrogen, $C_1$–$C_{20}$ hydrocarbon radicals and $C_1$–$C_{20}$ hydrocarbon radicals containing at least one heteroatom selected from the group consisting of phosphorus, sulfur, oxygen and nitrogen.

12. Pigmentary metal oxide according to claim 11 wherein the oxide is titanium dioxide.

13. Pigmentary metal oxide according to claim 11 wherein from 1 to 2 carbonyl groups are adjacent to the methylene carbon atom.

14. Pigmentary titanium dioxide treated with from 0.002 to 10 weight percent, based on titanium dioxide, of the reaction product of (a) an organic amine selected from the group consisting of $C_1$–$C_{20}$ primary, secondary and tertiary amines, and (b) an organic compound containing an activated methylene group, said organic compound being represented by the formula:

wherein C is a methylene carbon atom, R is a member of the group consisting of a monovalent electron withdrawing group and a mono-organic substituted bivalent electron withdrawing group which is adjacent to the methylene carbon atom, and R' and R" are each selected from the group consisting of R, hydrogen, $C_1$–$C_{20}$ hydrocarbon radicals and $C_1$–$C_{20}$ hydrocarbon radicals containing at least one heteroatom selected from the group consisting of phosphorus, sulfur, oxygen and nitrogen.

15. Pigmentary titanium dioxide treated with from 0.002 to 10 weight percent, based on titanium dioxide, of the reaction product of (a) an amine selected from the group consisting of triethanolamine, melamine, tribenzylamine, trihexylamine, and triphenylamine and (b) a member of the group consisting of acetylacetone, 1,1-diphenylacetone, 1-benzoylacetone, dibenzoylmethane, 2,4-pentanedione, malonamide and p-chloroacetoacetanilide.

References Cited

UNITED STATES PATENTS

| | | | |
|---|---|---|---|
| 2,274,521 | 2/1942 | Berry | 106—308X |
| 2,313,621 | 3/1943 | Bruson | 106—308OX |
| 3,172,772 | 3/1965 | Rowe | 106—308NX |
| 3,453,130 | 7/1969 | Feld | 106—300 |

TOBIAS E. LEVOW, Primary Examiner

H. M. S. SNEED, Assistant Examiner

U.S. Cl. X.R.

106—253, 288, 296, 297, 299, 301, 303, 304, 308